Figure 1:
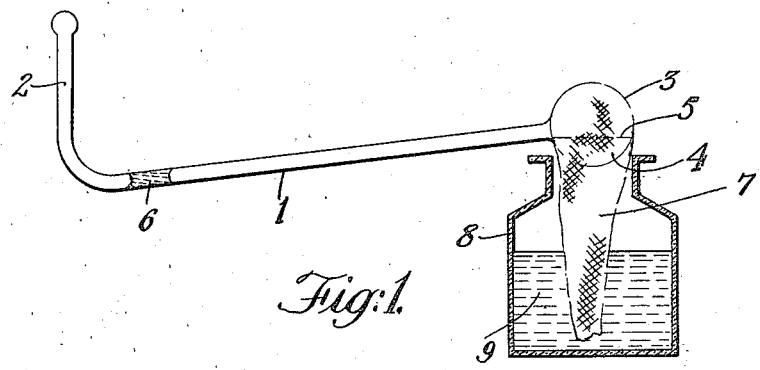

Aug. 5, 1924.  1,503,546

A. W. C. MENZIES
METHOD AND APPARATUS FOR OBTAINING REPEATED MOVEMENT OF A
LIQUID AND ITS VAPOR
Filed Dec. 1, 1920

Inventor
Alan W. C. Menzies
By his Attorney

Patented Aug. 5, 1924.

1,503,546

UNITED STATES PATENT OFFICE.

ALAN W. C. MENZIES, OF PRINCETON, NEW JERSEY.

METHOD AND APPARATUS FOR OBTAINING REPEATED MOVEMENT OF A LIQUID AND ITS VAPOR.

Application filed December 1, 1920. Serial No. 427,645.

*To all whom it may concern:*

Be it known that I, ALAN W. C. MENZIES, a subject of the King of Great Britain, and a resident of Princeton, in the county of Mercer and State of New Jersey, have invented certain new and useful Improvements in Methods and Apparatus for Obtaining Repeated Movement of a Liquid and Its Vapor, of which the following is a specification.

This invention relates to a method and apparatus for obtaining repeated movement of a liquid and its vapor in a closed vessel, and therefore works, by utilizing a difference of temperature between separated portions of the vessel. To accomplish this, one portion of an elongated vessel such as a closed tube having a bulb constituting a reservoir at one end is maintained at one temperature, and the distant end at another temperature, with a liquid in the vessel which will be volatile at the higher temperature and less volatile at the lower temperature, and in such volume that a portion of the liquid in the intermediate portion of the tube will flow under the higher vapor pressure in the portion of higher temperature to the portion of lower temperature to permit equalization of vapor pressure. The excess of liquid will then flow by gravity back toward the portion of higher temperature, whereupon the liquid in part volatilizes and the vapor pressure becomes such as to again force the liquid back to the region of lower temperature, whereupon equalization of pressure and some condensation again occur, the process being repeated indefinitely as long as the temperature difference between the two portions of the vessel remains. An engine or source of power is thus obtained which utilizes for its operation heat at, for example, room temperature, as distinguished from higher temperature heat customary in other forms of heat engines.

In carrying out the invention in its elementary form, a tube upturned closed ends is provided, with reservoir capacity at one end to contain a volume of volatile fluid, and the intermediate portion of the tube being at such angle as to permit the liquid to flow in either direction. One end of the tube is left at room temperature, and the other end is artificially cooled as by evaporation of water, so that the vapor pressure in the warm end tends to drive the fluid from the intermediate portion of the tube into the cool end in the form of a pulsation, whereupon the vapor pressure falls owing to condensation and equalization of pressure, and the excess liquid in the cold portion may thereupon return by gravity from the cold portion to the warm portion. The broad invention is capable of being carried out in various manners, and is applicable to a number of uses, one of which is to act as a humidity indicator and another is for toys, to which many applications of the principle can be made.

In the accompanying drawings,—

Figure 2:
Figure 3:
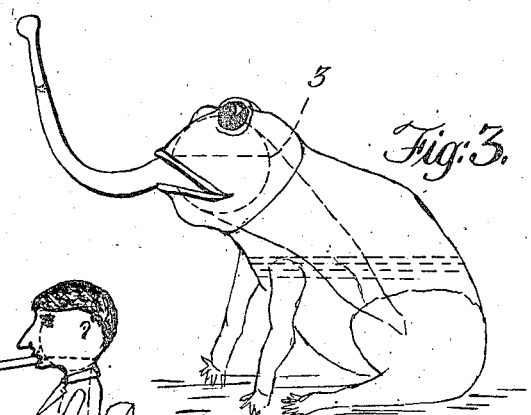
Figure 4:
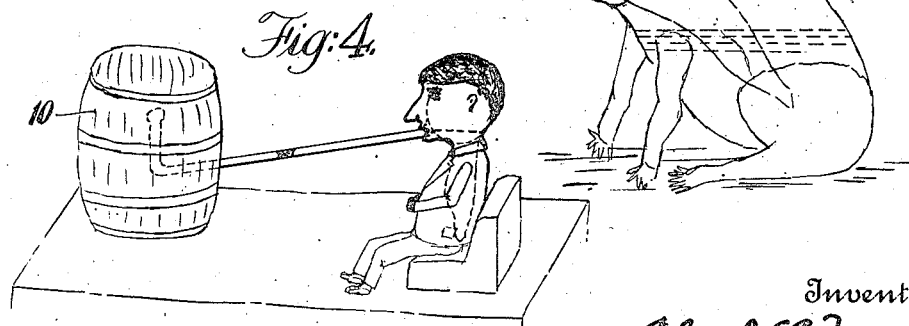

Figure 1 is an elevation of an apparatus embodying the invention, useful as a humidity indicator, Figure 2 is an elevation of a slight modification, and Figure 3 shows another modification thereof applied to a toy, and Figure 4 shows the modification of Figure 1 applied to a toy.

Referring now to the drawings, Figure 1, 1 represents an inclined tube having a vapor chamber 2, at the warm end and a condensing chamber or bulb 3 at the cold end, formed to provide a reservoir 4 in which a body of volatile liquid 5, such as chloroform, may be contained. The volume of liquid is such as to slightly exceed the volume of the reservoir 4, before overflowing into the tube, this excess in Figure 1 being indicated by the drop or liquid thread 6. This is the condition when the entire tube is at the same temperature. If now one end of the tube, as 3, is provided with a wick 7, dipping into a reservoir 8, containing water or other volatile liquid 9, the capillarity of the liquid will wet the entire wick covering the reservoir end as shown, and thus the evaporation of the liquid will cool this end below room temperature. The vapor pressure in 2 will consequently force the drop 6 back into the reservoir whereupon the vapor pressure throughout the entire system is momentarily equalized. The excess of fluid again flows back down the tube by gravity, whereupon the process repeats itself indefinitely as long as the supply of liquid to the wick is maintained. This flow may be as a drop filling the bore, or as is more often the case in Figure 1, as a thin stream down the bottom of the tube as in a trough, finally collecting in the thread or drop 6. The engine may thus be regarded as deriving its motive power from the molecular movement that is operative during evaporation, aided at times by air drafts which are adjuvant to the diffusion of water vapor in still air.

In Figure 2 the same principle is applied so as to cause a series of bubbles to pass up the tube, the bulb 3 being maintained wet as in Figure 1 and the tube inclined. In this case, the diameter of the tube is somewhat larger than that in Figure 1 to permit the formation of bubbles, as with a tube of smaller diameter the surface tension of the liquid will give rise to capillarity thus closing the bore.

In Figure 3, a toy figure such as a frog is made hollow to provide the water reservoir, the head being loose to act as a stopper and carrying the tube, reservoir and wick. In this case, the head is either composed entirely of absorbent material carrying the wick dipping into the reservoir, or else is of molded form covered with cloth extended to dip into the reservoir, the head being, of course, painted and decorated in any desired manner. In this form, the tube is curved, but acts to show pulsations of liquid as the vapor pressure equalizes. A tube of the form here shown will produce bubbles caused by a traveling of the meniscus downward to the right under vapor pressure until the bubble of vapor is delivered into the reservoir, after which the meniscus returns to initial position upon equalization and the process repeats itself.

In order for the pulsations of the liquid to be visible and in order for the transfer of vapor and liquid to be repeatedly carried on, the tube connecting the vaporizing and condensing chambers must be sealed in at least a portion thereof, at least part of the time.

In Figure 4 a modification is shown in which the toy figure of a man appears to be drinking from a barrel 10, the tube simply extending into the barrel, and the whole being on a base.

These and other forms of apparatus employing this principle thus constantly exhibit motion as long as sufficient cooling is available at one end. Experiment shows that the speed of operation, for example that of Figure 3 is directly proportional to the speed of evaporation from the wick. Consequently, forms of this apparatus may be used as dynamic indicators of the speed of evaporation of water in any situation. Such indicators will be useful in houses to determine whether or not the air is too dry, which is almost invariably the case with artificial heating, since by counting the number of pulsations per minute and comparing same with a table to be furnished it can be determined whether or not the air should be more moist, because the number of pulsations will fall as the moisture increases. For example, moist air at 65° F. is more comfortable than dry air at 70° F., so that this apparatus furnishes a cheap and simple means of enabling the proper humidity to be determined.

The invention is applicable to numerous other purposes and in other forms than herein described, and I do not restrict myself except as required by the appended claims inasmuch as the invention is broadly to be considered as a form of heat engine.

What I claim is:

1. An article of manufacture comprising a pair of closed vapor chambers, a tube connecting the same located to permit flow of liquid and vapor between the chambers, a volatile liquid contained therein, means for creating such temperature difference between said chambers as to vaporize the liquid in one chamber and condense the vapor in the other to repeatedly transfer vapor from the vaporizing chamber to the other chamber, and liquid from the latter to the former through said tube.

2. An article of manufacture comprising a pair of closed vapor chambers, a tube connecting the same located to permit flow of liquid and vapor between the chambers, a volatile liquid contained therein, means for creating such a temperature difference between said chambers as to vaporize the liquid in one chamber and condense the vapor in the other to repeatedly transfer vapor from the vaporizing chamber to the other chamber, and liquid from the latter to the former through the tube, said tube being inclined and of sufficiently large diameter to contain a bubble of vapor and some liquid in the same portion of the tube as the bubble.

3. An article of manufacture comprising a pair of closed vapor chambers, a tube connecting the same located to permit flow of liquid and vapor between the chambers, a volatile liquid contained therein, means for creating such a temperature difference between said chambers as to vaporize the liquid in one chamber and condense the vapor in the other to repeatedly transfer vapor from the vaporizing chamber to the other chamber, and liquid from the latter to the former through said tube, said means including a device for moistening one chamber externally and cooling the same by evaporation to below room temperature.

4. An article of manufacture comprising a pair of closed vapor chambers, a tube connecting the same located to permit flow of liquid and vapor between the chambers, a liquid volatile at about room temperature contained in one of said chambers and of sufficient volume to overflow into said connecting tube by gravity when the vapor pressures in said chambers are equal, means for creating such a temperature difference between said chambers as to vaporize the liquid in one and condense the vapor in the other to repeatedly transfer vapor from the vaporizing chamber to the other chamber, and liquid from the latter to the former through the tube, said means including a device for moistening one chamber externally and cooling the same by vaporization to below the room temperature of the warmer chamber.

5. The method of producing backward and forward movement in a closed system including upwardly directed end portions and an intermediate elongated, inclined passage connecting the end portions, the end portion at the higher end of the passage being enlarged, of a body of liquid sufficient to seal said passage; said method consisting in raising the vapor pressure at one end portion by heat absorption while lowering the vapor pressure at the other end portion by cooling to move the body of liquid up the inclined passage against gravity until it moves into the enlarged end portion and breaks the seal and thus equalizes the pressures, the liquid then returning by gravity to restore the seal.

6. The method of producing backward and forward movement of a limited body of liquid sufficient to seal the intermediate portion of an elongated inclined passage closed at its ends, said method comprising raising the vapor pressure at one end by heat absorption while lowering the vapor pressure at the other end by external evaporation of a second liquid to move the body of liquid against gravity until it breaks the seal and equalizes the pressures, and returning the liquid by gravity to restore the seal during the continuance of said heat absorption and of said evaporation.

7. The method of effecting pulsation of a limited body of liquid in the intermediate portion of an inclined tube closed at its ends, said method comprising raising the vapor pressure in the passage on one side of the liquid by heat absorbed from the room while lowering the vapor pressure in the passage on the other side by evaporation of a supplied liquid to cause the fluid to move against gravity until the pressures equalize, and returning the fluid by gravity upon equalization of pressure during the continuance of said heat absorption and of said evaporation.

8. As an article of manufacture, a closed tube containing a volatile fluid and having one end angularly disposed to the intermediate portion and having at the other end an enlargement, said angularly disposed end extending upwardly when the tube is held with its intermediate portion inclined with said enlargement at the upper end thereof.

9. As an article of manufacture, a closed tube containing a volatile fluid and having one end angularly disposed to the intermediate portion and having at the other end an enlargement, said angularly disposed end extending upwardly when the tube is held with its intermediate portion inclined with said enlargement at the upper end thereof, and means maintaining said enlarged end cool in relation to said angularly disposed end.

10. As an article of manufacture, a tube having one end angularly disposed to the intermediate portion and having at the other end an enlargement, said angularly disposed end extending upwardly when the tube is held with its intermediate portion inclined with said enlargement at the upper end thereof, and means for lowering the pressure in the enlarged end relative to said other end.

11. An article of manufacture such as an evaporation indicator, toy or the like, comprising a reservoir for water or the like having an open top adapted to support a reservoir bulb, a wick adapted to dip into the reservoir and carried by the bulb to cool same by evaporation, a tube leading from and hermetically joined to the bulb and terminating in a closed vapor space, and a volatile liquid in the tube.

12. The method of producing backward and forward movement in a closed tube having an elongated inclined intermediate portion, an end portion communicating with the intermediate portion at the lower end thereof and extending above the adjacent parts of said intermediate portion, and an enlarged end portion communicating with said intermediate portion at the upper end of the taller and extending both above and below the adjacent parts of said intermediate portion; said method consisting in raising the vapor pressure at the lower end of the tube by heat absorption while lowering the vapor pressure at the upper end by cooling so as to cause a body of liquid sufficient to seal the intermediate portion of the tube to move up said intermediate portion against gravity until it moves into the upper end portion and breaks the seal and thus equalizes the pressures, the liquid then returning by gravity to restore the seal.

Signed at Princeton, in the county of Mercer and State of New Jersey, this 29th day of November A. D. 1920.

ALAN W. C. MENZIES.